May 7, 1968 D. H. HOWLING ETAL 3,381,903
MATERIAL COMMINUTING APPARATUS
Filed March 1, 1966 4 Sheets-Sheet 1

INVENTORS
DENNIS H. HOWLING
JOSEPH M. HOSKINS
BY
Kenway, Jenney + Hildreth
ATTORNEYS May 7, 1968  D. H. HOWLING ET AL  3,381,903
MATERIAL COMMINUTING APPARATUS
Filed March 1, 1966  4 Sheets-Sheet 2
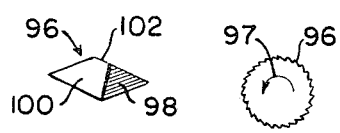
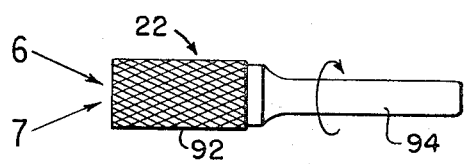
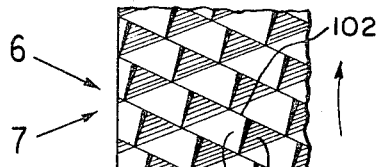
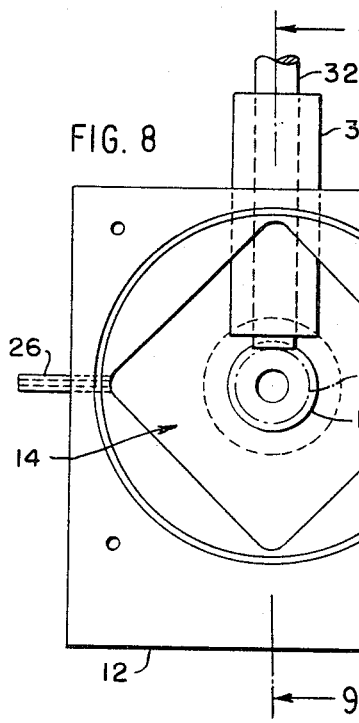
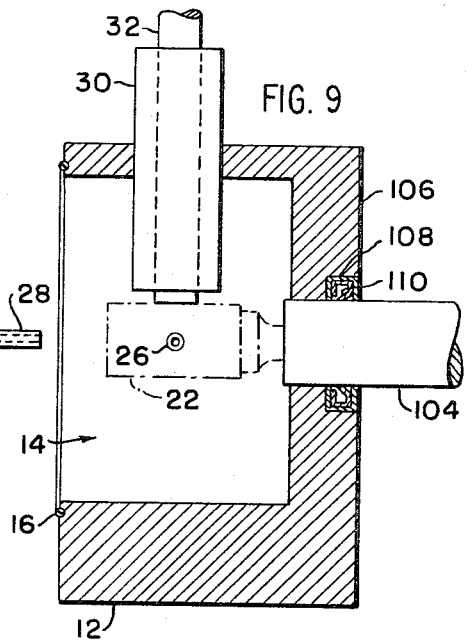
INVENTORS
DENNIS H. HOWLING
JOSEPH M. HOSKINS
BY
Kenway, Jenney & Hildreth
ATTORNEYS

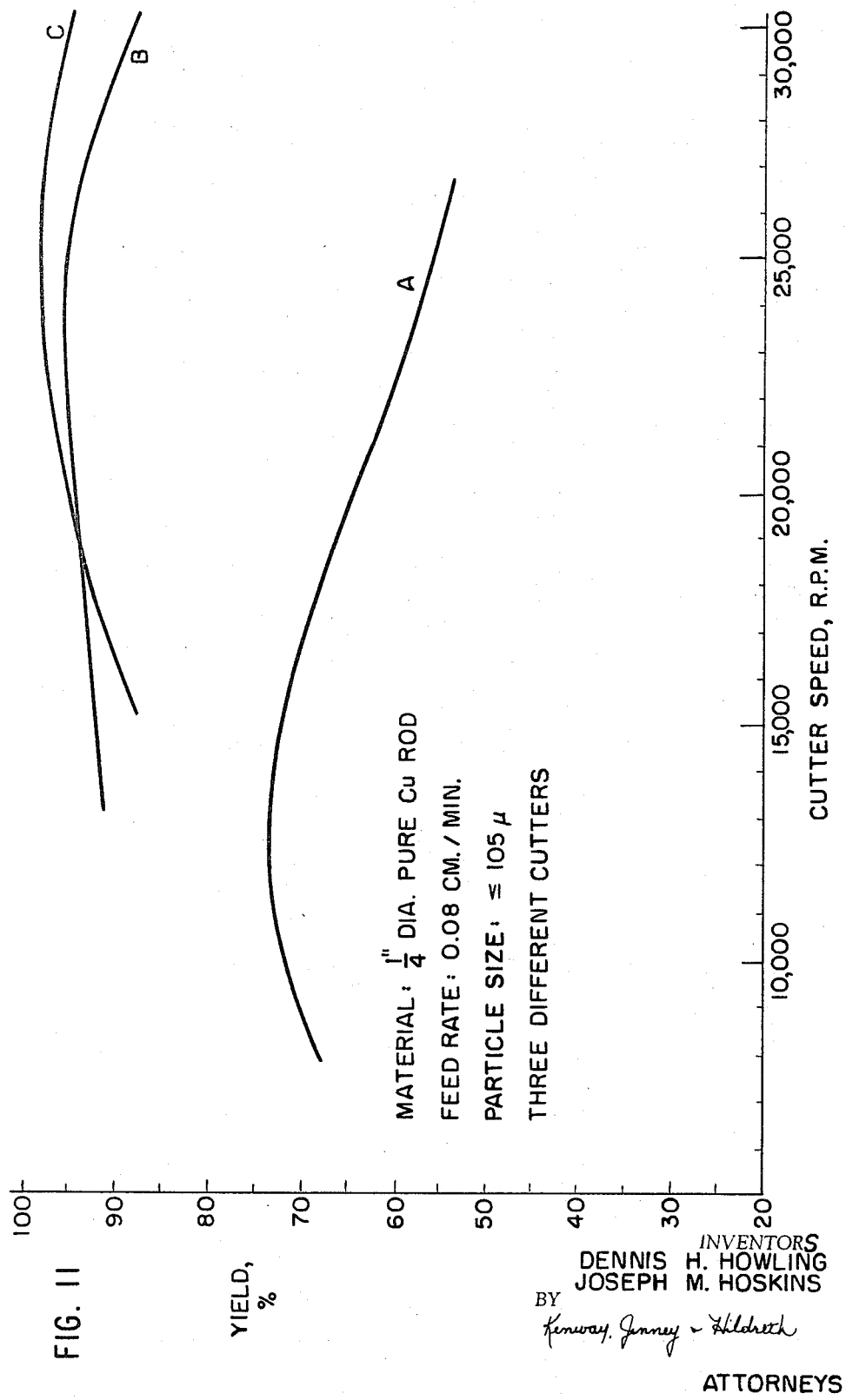

United States Patent Office 3,381,903
Patented May 7, 1968

3,381,903
MATERIAL COMMINUTING APPARATUS
Dennis H. Howling and Joseph M. Hoskins, Wayland, Mass., assignors to Kennecott Copper Corporation, New York, N.Y., a corporation of New York
Filed Mar. 1, 1966, Ser. No. 530,859
6 Claims. (Cl. 241—63)

Our invention relates to material comminuting apparatus. In particular, it relates to material comminuting apparatus for the preparation of extremely fine particles of metals, alloys, or other materials in which the distribution by weight of the various particle sizes may be controlled to a greater extent than heretofore possible and in which the yield of particular sizes of finely-divided particles may be increased. The apparatus of our invention is particularly useful for the preparation of powdered metal samples for nuclear magnetic resonance studies.

Nuclear magnetic resonance studies of metal or alloys are very useful in providing data concerning the physical properties of the materials under study. In such studies, metal particles having at least one dimension smaller than the skin penetration depth of the bombarding particles are both desirable and necessary. Prior methods for preparing sample particles for such studies included a variety of filing and grinding techniques which were both laborious and time consuming. In all of these techniques, a much larger quantity of metallic power was required to be prepared than was actually used in the study, since typically only a very small percentage of the powdered metal by weight of such a particle size as to be useful in the study. We have found that by providing a rotary cutting tool having a large number of shallow, sharply defined cutting teeth, and by rotating this cutting tool against the sample stock at very high speeds, the stock itself being slowly rotated and translated against the cutting tool, a comminuting machine of superior performance may be obtained.

Accordingly, it is an object of our invention to provide an improved material comminuting apparatus. Further, it is an object of our invention to provide an improved material comminuting apparatus in which a high percentage of finely divided flakes or platelets of small size may be obtained. Yet another object of our invention is to provide an improved material comminuting apparatus in which the yield of particles of a given size range may be significantly increased under control of the operator of the apparatus. One feature of our invention resides in providing a unitary feed guide and heat sink which assists in providing control of the cutting operation. Another feature of our invention resides in providing a particle collection chamber disposed about the cutting device which allows the operator to control the environment in which the cutting is performed.

The above and other and further objects and features of our invention will become more readily apparent in conjunction with the following detailed description of a preferred embodiment thereof which has been selected for purposes of illustration and which is shown in the accompanying drawings in which:

FIG. 2 is a plan view of a preferred type of rotary cutter for use with the apparatus of our invention;

FIG. 3 is an end view of the cutting device of FIG. 2;

FIG. 4 is a pictorial view of a typical cutting tooth as contained in the cutting device of FIG. 2;

FIG. 5 is an enlarged plan view of a section of the cutting device of FIG. 2 showing the arrangement of the individual teeth therein;

FIG. 6 illustrates a portion of an end view of the cutting tool of FIG. 2 taken in the direction generally indicated along the line 6 of that figure;

FIG. 7 illustrates a portion of an end view of the cutting tool of FIG. 2 taken along the line 7 of that figure;

FIG. 8 is an enlarged view of the particles collection chamber used in conjunction with out invention;

FIG. 9 is a side view of the particle collection taken along the line 9—9 of FIG. 8;

FIG. 11 is a graph of the percentage yield by weight of particles of a given size distribution as plotted against the cutter rotation speed for three different types of cutter.

Figure 1:
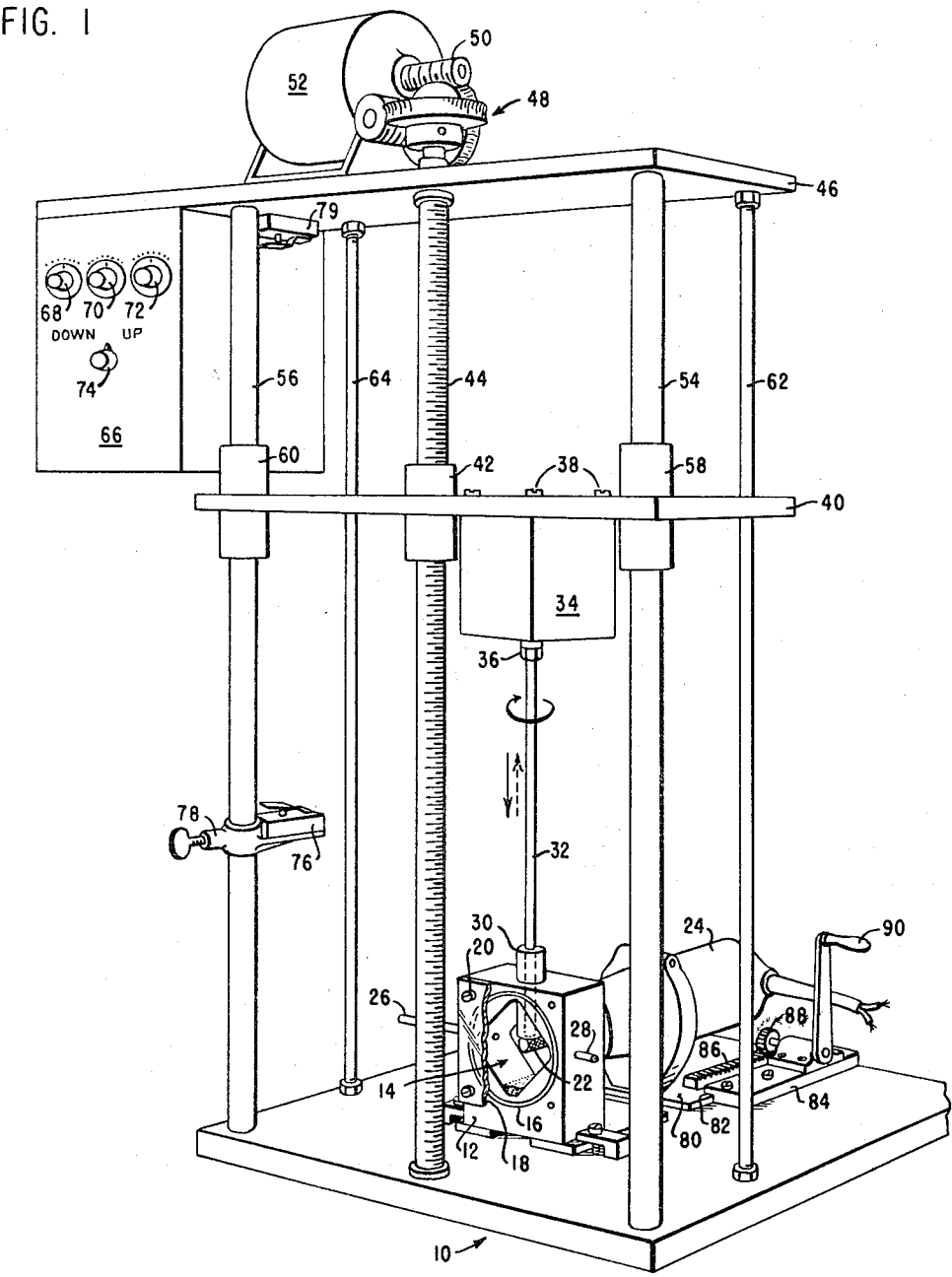
FIG. 1 is a pictorial view illustrating the material comminuting apparatus constructed in accordance with our invention.

Referring now to FIG. 1, there is shown therein a material comminuting apparatus having a base plate 10 on which is mounted a particle collection chamber 12 having a diamond shaped cavity 14 formed therein. Surrounding the cavity 14 on the front of the face of the chamber is an O-ring or seal 16 over which is disposed a cover plate 18 which may be secured to the chamber 12 by means of symmetrically disposed screws 20. The chamber 12 may be formed from a metal or a plastic material, but is preferably metal for reasons which will appear below. Positioned within the cavity 14 is a cutting tool 22, the shank of which extends through the rear face of the chamber 12 and is attached to the rotor of a motor 24. In order to accommodate our apparatus to preparation of particles of a wide variety of sizes from different types of materials, the motor 24 is preferably a variable speed motor which is capable of operating at extremely high speeds and over a wide speed range.

A gas line 26 extends through one of the side walls of the particle collection chamber in order to supply fluids (gases or liquids) for cutting in a controlled environment when desired; fluid may be exhausted from the chamber by means of the exhaust line 28 which extends through a side wall of the chamber into the cavity 14. Extending through the upper wall of the chamber 12 is a feed guide sleeve 30 having a central passageway therethrough, the walls of which snugly enclose a rod 32; a small amount of clearance is provided between the inner walls of the guide 30 and the rod stock 32 in order to allow the rod to rotate freely in the guide under control of a motor 34 whose output shaft is attached to the rod 32 by means of a fitting 36. The motor 34 is preferably a low speed motor of the variable speed type.

The motor 34 is attached by means of screws 38 to a table 40. The table 40 is moved upwardly and downwardly by means of a collar 42 rigidly attached to the table; the collar 42 is threaded to engage a threaded shaft 44, the lower end of which is pivotally mounted in the table 10 and the upper end of which extends through a table 46 to a gear train 48. A rotor shaft 50 of a bidirectional variable speed motor 52 drives the gear train 48 to provide rotation to the shaft 44. Rotation of the shaft 44 causes the table 40 to ride upwardly or downwardly, depending on the direction of rotation of the rotor shaft 50. Guide bars 54 and 56, which are rigidly attached to the upper table 46 and to the lower table 10 guide the table 44 in vertical motion by means of the collars 58 and 60 which are rigidly attached to the table 40 and which slide freely along the bars 54 and 56 respectively. Spacing bars 62 and 64 extend between the upper table 46 and the lower table 10 to provide additional support for the upper table. A motor control unit 66 which is rigidly attached to the upper table 46 contains variable speed controls 68, 70 and 72 for the motors 24, 34, and 52 respectively, and also contains a directional switch 74 for controlling the direction of motion of the table 40. A lower limit switch 76 is mounted on the guide bar 56 by means of a collar 78; this switch interrupts the lower supply to the motor 52 in order to stop the table 40 in the area of the limit switch 76. An upper limit switch 79 is attached to the underside of the table 46 and performs a similar function in stopping the motor 78 at an upper limit of motion. The controls 68, 70 and 72 may comprise series of shunt variable resistances which are placed in circuit arrangement with the motors 24, 34 and 52 or may comprise variable power transformers; the use of these devices to provide a variable speed control is well known in the art and accordingly need not further be described.

It will be noted that the motor 24 is mounted on a plate 80 which is driven in a key way 82 of a guide plate 84 by means of a rack 86 and a pinion 88; pinion 88 in turn may be rotated by means of a handle 90. The purpose of this arrangement is to allow the rotary cutting tool 22 to be advanced inwardly or outwardly of the cavity 14 of the chamber in order that different segments of the cutting tool may be exposed to the rod stock 32. It will be apparent that a cyclical driving motor might replace the handle 90 as the driving means for the pinion 88 if such is desired; alternatively, the motor 24 may be rigidly attached to the base 10. The electrical leads from the motors 24, 34 and 52 to the motor control unit 68 have not been shown in detail since the method of making these connections is well known in the art; similarly, the connection of the limit switches 76 and 79 to the motor 52 has not been shown in FIG. 1 although it will be understood by those skilled in the art that such connections will be made in practice.

The operation of the apparatus of FIG. 1 is as follows:

Table 40 is moved to its uppermost position by means of the vertical motion control switch 74 and the motor 52. A piece of rod stock material 32 is then inserted in the fitting 36 on the rotary output shaft of the motor 34 and the fitting 36 is locked to securely retain the rod stock 32. The limit switch 76 is positioned on the bar 54 by means of the collar 78 to cut off the vertical driving motion applied to the table 40 when a predetermined amount of material has been fed to the cutter 22. Table 40 is then lowered and the rod 32 is inserted into the feed guide 30. A typical feed rate for the stock 32 would be on the order of 1 centimeter per minute; the particular feed rate chosen will be dependent upon the size of the particles one wishes to obtain, as will be made more clear hereinafter. The motor 24 is then actuated to drive the cutting tool 22 and the motors 34 and 52 are similarly actuated to provide rotational and translational motion to the feed stock 32. Typical rotational speeds for the motor 24 and the motor 52 are on the order of 25,000 r.p.m. and 60 r.p.m. respectively; again, the particular speeds used will be dependent upon the size of the particles which it is desired to obtain.

As the rod stock 32 is advanced against the cutter 22, tiny flakes or platelets are cut out of the end of the rod by the cutter 22 and these flakes eventually fall to the bottom of the chamber 12. Due to the rotation of the rod stock as it is fed to the cutter, the end of the rod stock is nearly flat and does not form a groove to conform to the shape of the cutting tool as it would otherwise do if the rod 32 were not rotated. The feed guide 30 restrains the sideward thrust of the rod stock material which would occur when the rod stock material contacts the cutting tool 22; in addition, the guide 30 assists in transferring heat from the rod stock 32 to the chamber 12 (if the chamber is formed from a metallic material) and to the atmosphere. This heat transfer becomes important when it is desired to obtain finely divided particles from the apparatus.

If the rod stock material is cut in the atmosphere, it is possible that the particles of various materials will form an oxide coating on the surfaces thereof, thus providing a contaminant on the particles which may be undesirable. Accordingly, means have been provided for isolating the cavity 14 of the chamber 12 form the outside environment. These means comprise the fluid inlet line 26 and the fluid exhaust line 28 in conjunction with the O-ring seal 16 and the face plate 18. By means of the lines 26 and 28, a fluid (either gas or liquid) may be supplied to and exhausted from the cavity 14 of the chamber 12 in order to permit cutting of the rod stock material in a controlled environment. For example, an inert gas such as argon or nitrogen may be supplied through the line 26 to prevent oxidation of the particles formed by the cutter 22. These gases will also assist in providing heat transfer from the cutter and rod stock and will thus assist in maintaining lower temperature of the cutter and stock. Alternatively, a liquid such as oil, or liquified nitrogen may be supplied to the cavity to assist in cooling and to provide a controlled environment of the type desired. It will be apparent that the exhaust lines 28 may be omitted in cases where gas is supplied through the line 26, since this gas may escape from the cavity through the clearance provided between the rod stock 32 and the inner wall of the feed guide 30.

In some cases, it may be found desirable to prolong the life of the cutting tool 22 by exposing different portions of the tool to the rod stock 32. This may readily be accomplished by mounting the driving motor 24 on a movable plate 80 which can be moved in the key way 82 of a guide plate 84 by means of a rack pinion 86 and 88 respectively and a handle 90 or by means of a driving motor connected to the rack and pinion for cyclical operation.

FIG. 2 is a plan view of a typical cutting tool which may be utilized as the tool 22 of FIG. 1. The particular cutter shown in an Atrax #A–185 Spec. fine Dia-Mo cutter of ½" diameter and having approximately 56 flutes helically cut around its periphery.

As shown in FIG. 2, the cutting tool 22 has a cutting face 92 and a shank 94. The cutting face 24 has a plurality of cutting teeth which are shaped approximately in the form of pyramids. As may be seen from FIG. 3, which is an end view of the cutting tool of FIG. 2, these teeth have one edge which is approximately vertical and one edge which is inclined at an angle to the front face of the tooth. The teeth are rotated in such a direction as to present their vertical faces to the cutting tool as may be seen from the arrow 98 in FIG. 3 indicating the direction of rotation of the tool. A plan view of a single tooth which is positioned in approximately the same direction as the teeth shown on the cutting tool of FIG. 2 is illustrated in FIG. 4. As shown in that figure, the tooth 96 has faces 98 and 100 which are inclined at an angle to the vertical; the remaining faces of the tooth 96, which are obscured by the faces 98 and 100 in the drawing, are formed in a vertical direction and cooperate with the faces 98 and 100 to form a cutting edge 102.

The positioning of the individual teeth 96 with respect to each other may be seen more clearly in FIG. 5 of the drawings which illustrates in plan view an enlarged portion of the cutting face of the tool 22 of FIG. 2. As may be seen from FIG. 5, the teeth are arranged in a helical fashion around the tool 22 and the cutting edges 102 thus also forming a helical cutting band which is presented to the workpiece against which the cutter is positioned. Due to the shape of the individual teeth, the rows of teeth present a saw-tooth like appearance when viewed along the line 6 of FIGS. 2 and 5 as may be seen in FIG. 6 and present a square topped saw-tooth like appearance when viewed along the line 7 of FIGS. 2 and 5, as may be seen in FIG. 7.

The action of the cutting tools of this type is distinct from that of either a file or a grinder in that the cutting surfaces 102 slice off distinct flakes or platelets of material as the rod stock material is advanced against the cutting surface. By operating the cutting tool at a sufficiently high rate of speed and by feeding the material to the cutting surface at a very slow rate of speed, it will be found that particles that readily pass through a number 400 Tyler mesh (37 micron opening) can readily be obtained with the apparatus of our invention; these particles have a thickness of approximately six microns.

FIG. 9 shows a front elevational view of the particle collection chamber 12. As may be seen in this figure, the feed guide 30 is positioned immediately adjacent the rotary cutting tool 22. The rod stock material 32, which is fed down the central passage of the guide 30, is fed to the cutting tool 22. In addition to preventing the rod 32 from shifting to one side due to the rotary action of the cutter 22, the guide 30 serves as a heat sink for heat generated in the rod due to the cutting action and thus provides a cooling effect to the rod 32. For this reason, the clearance between the guide 30 and the rod 32 is limited to very small dimensions in order to maximize the heat transfer from the rod to the guide while permitting the rod to rotate freely within, and translate along, the central passageway of the guide. This geometry of the guide thus assists in obtaining smaller particles by reason of the cooling effect of the guide and also assists in obtaining more nearly uniform particles by preventing side thrusting of the rod stock.

As will be seen in FIG. 8, the cavity 14 is formed in a diamond shape; the purpose of this is to assist the particles in settling to the bottom of the cavity and to prevent the upsweep of particles into the clearance area between the rod stock and the interior walls of the guide. If particles were to be swept up into this clearance area, it would be found that frictional forces between the particles and the rod stock material would cause erratic feeding of the rod stock to the cutter, resulting in a loss of control over the particle size distribution. Forming the cavity in a diamond shaped configuration modifies the swirling flow of air or gas within the chamber that is created by rotation of the cutter and prevents the upsweep of particles into the clearance area. Positioning the feed guide away from the upper portion of the cavity 14 and very nearly adjacent the cutting tool 22 also assists in maintaining the clearance area free of particles.

It will be noted that the diameter of the rod stock material is less than the diameter of the cutting tool; this insures that only a small portion of the end surface area of the rod stock material will be presented to the cutter at a given time; this again assists in providing particles of very small size.

FIG. 9 is a side view of the chamber of FIG. 8 taken along the lines 9—9 of that figure. A rotor shaft 104 of the motor 24 of FIG. 1 is fitted through the rear wall 106 of the chamber 12. A gland 108 is provided in the rear wall 106 of the chamber and is circularly disposed around the shaft 104 when this shaft is inserted through the wall. The gland 108 contains packing 110 which may consist of a piece of leather or other flexible material in order to provide a seal that is fluid tight.

Figure 10:
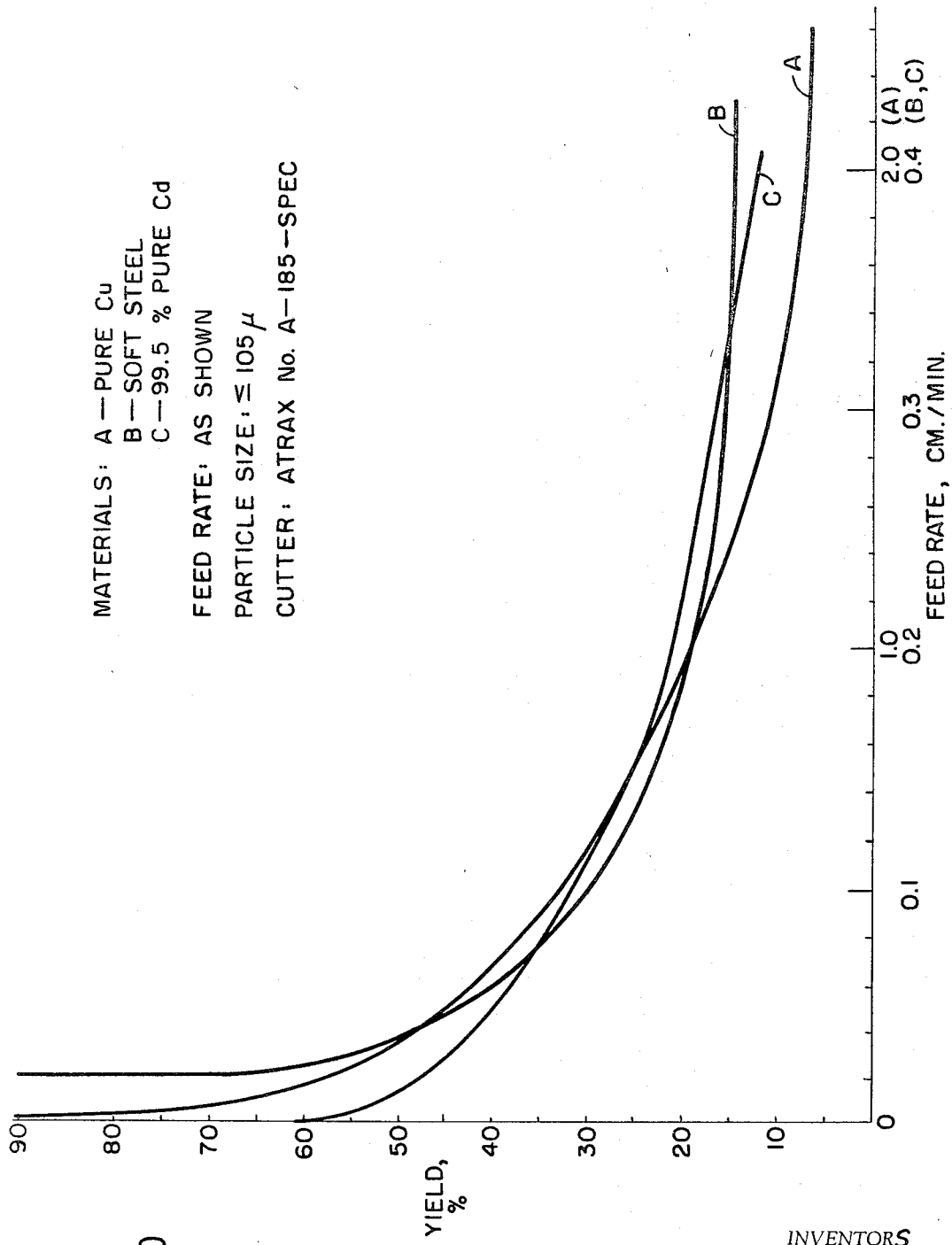
FIG. 10 is a graph of the percentage yield by weight of particles of a given size range as plotted against the feed rate of the rod stock material for three different types of materials.

Referring now to FIG. 10, there is shown a graphical plot of the percentage yield (by weight) of particles of a given size versus the vertical feed rate (translational motion) of the rod stock material 32 against the cutting tool 22 in centimeters per minute. The graph of FIG. 10 contains three plots, these curves being identified as A, B, and C, respectively. Curve A was obtained for a rod of pure copper material, curve B was obtained for a rod of soft steel, and curve C was obtained for a rod of 99.5% pure cadmium. All data was obtained using an Atrax number A–185 Spec. Dia-Mo cutter of ¾ inch diameter and having 64 flutes around its periphery. The cutter was operated at a rotary speed of 27,000 r.p.m. and this speed was maintained constant throughout the testing. The curves show the percentage yield (by weight) of particles which were capable of passing through a number 150 Tyler mesh; this corresponds to particles having a maximum dimension equal to or less than 105 microns. As may be seen from FIG. 10, the yield of particles having a maximum dimension equal to or less than 105 microns increased dramatically as the feed rate of the rod stock was reduced toward zero. Additionally, it may be seen that at a given feed rate, the percentage yield of particles using a sample of pure copper was much higher than that obtained at the same feed rate when samples of soft steel or cadmium were used. Similar particle size distribution charts corresponding to various particle size ranges may be plotted in the manner shown in FIG. 10 and used to determine the required operating conditions in order to obtain a given yield of particles in a pre-selected particle size range. Thus, it will be seen that the apparatus of our invention provides a controllability of the cutting operation which was not heretofore available with prior comminuting apparatus.

FIG. 11 is a graph of the percentage yield (by weight) of the particles versus cutter speed in r.p.m. for different cutters for particle size distribution of less than 105 microns. The cutting tools used in obtaining the data for this figure were as follows:

For curve A, an Atrax number A–185–Spec. fine Dia-Mo cutter of ¾ inch diameter and having 64 flutes around its periphery; for curve B, an Atrax A–141–FD fine Dia-Mo cutter of ½ inch diameter and having 56 flutes around its periphery; for curve C, a Pratt and Whitney 40A–WD 96 cutter of ½ inch diameter and having 96 right-hand cuts and 60 left-hand cuts around its periphery. The material used in obtaining all three curves was a ¼ inch dameter pure copper rod rotating at a constant speed of 56 r.p.m. and being fed with a translational feed rate of 0.08 centimeters per minute. Feed rates of this low value provide the maximum yield of small particles, and the cutter is operating in a "starved" mode under these conditions. The graph was plotted for percentage yield of particles having a maximum dimension equal to or less than 105 microns. As will be seen from the curves, a ¾ inch diameter cutter gives a maximum yield when the cutting tool is operated at a rotary speed of approximately 13,000 r.p.m. If a cutting tool of smaller diameter is used, such as the half inch diameter cutting tool used to obtain curves B and C, it will be seen that the maximum yield occurs at a much higher cutting speed (approximately 25,000 r.p.m.) but also gives a much greater particle yield. As is the case with FIG. 10, similar curves could be drawn for different particle size distribution ranges to assist the user in determining the appropriate combination of cutting tool, rotary cutting speed, and feed rate for a given material.

In some cases it will be found desirable to obtain particles of even smaller size than that obtained by a first cutting operation using the apparatus of our invention. In such a case, particles obtained from the first cutting operation may be embedded in a plastic material such as Lucite and the material allowed to dry while being formed into a rod-like shape. The plastic rod may then be comminuted using the apparatus of our invention in like fashion as was the rod of metal or alloy, and the size of the particles obtained with this process will be even further reduced. In most cases, however, it will be found that when proper operating conditions are chosen, the material to be comminuted need be passed through the apparatus of our invention only once.

It will thus be seen that we have provided an efficient comminuting apparatus. Further, it will be seen that we have provided a comminuting apparatus in which the particle size distribution of the comminuted material is controllable over a broad range at the will of the operator. Further, we have provided a comminuting apparatus in which the yield of particles of various size dstributions may be controlled at the will of the operator, the yield of particles of one size distribution being increased at the expense of the yield of particles of another size distrbusion by proper selection of the cutting speeds of the cutter and the translational and rotational speeds of the rod stock material.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

Having described my invention, I claim:

1. Apparatus for reducing rod stock material to finely comminuted particles of controllable yield and predetermined size in the range of from 10 to 1,000 microns, said apparatus comprising, in combination, rotary cutting means having a plurality of cutting edges arranged helically about the periphery thereof, means for rotating said cutter at speeds in excess of 5,000 r.p.m., a substantially fluid tight particle entrapment means disposed around said cutting means and having feed guide means extending therethrough and terminating immediately adjacent said cutting means, said guide means having a central passageway therethrough of slightly larger dimension than said rod stock material, means mounting said stock for translating motion along an axis through said passageway and perpendicular to the rotational axis of said cutting means, and means for rotating said rock stock about its translational axis.

2. The combination defined in claim 1 in which said feed guide means comprises a closely-fitting sleeve surrounding said rod stock material, said sleeve being formed from metal to provide a heat sink for the dissipation of heat from said material.

3. The combination defined in claim 1 in which said particle entrapment means comprises a substantially fluid-tight chamber having an inlet port and an exhaust port through which fluid may be supplied to the rod stock material adjacent said cutting means to effect cutting in a controlled environment and to assist in the dissipation of heat from said material.

4. The combination defined in claim 2 in which said rod stock material is fed to said cutting means at a translational speed of less than 3 centimeters/minute.

5. The combination defined in claim 4 in which said means for rotating the rod stock material rotates said material at an angular rate in the range of from 30 to 120 r.p.m.

6. The combination defined in claim 5 in which said particle entrapment means contains a noncircular-shaped cavity.

References Cited

UNITED STATES PATENTS

| | | | |
|---|---|---|---|
| 2,431,294 | 11/1947 | Dulmage | 241—279 |
| 2,446,345 | 8/1948 | Snow et al. | 241—279 |
| 2,462,090 | 2/1949 | Galvin | 241—279 XR |
| 3,170,647 | 2/1965 | Loftin | 241—280 |

WILLIAM W. DYER, JR., *Primary Examiner.*

W. D. BRAY, *Assistant Examiner.*